Nov. 19, 1946. J. LEVINE 2,411,217
PEANUT ROASTER
Filed Aug. 19, 1944 2 Sheets-Sheet 1
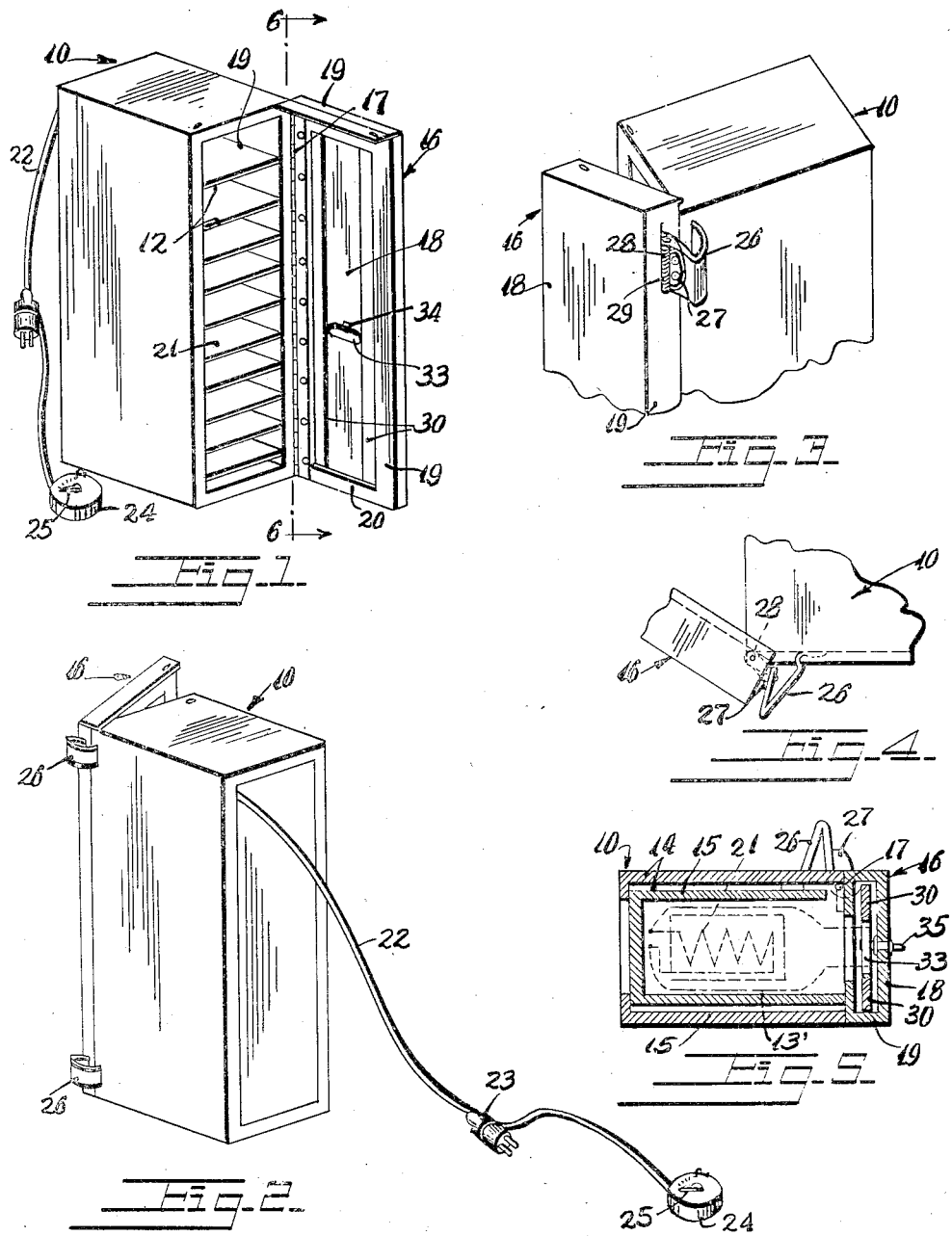

Nov. 19, 1946. J. LEVINE 2,411,217
PEANUT ROASTER
Filed Aug. 19, 1944 2 Sheets-Sheet 2
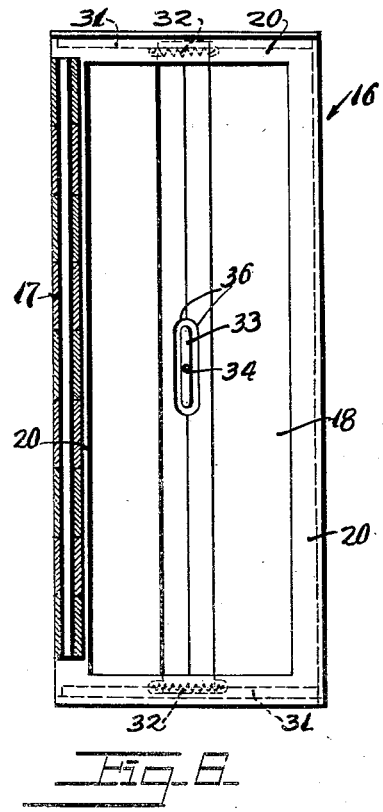
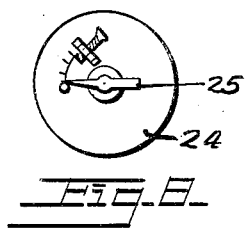
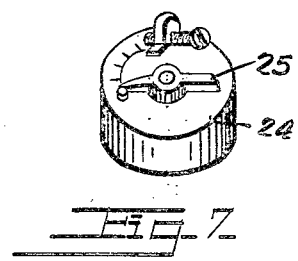
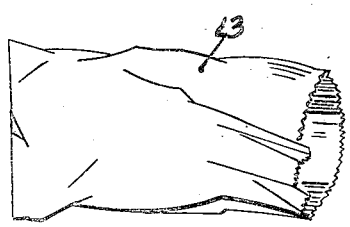
INVENTOR.
John Levine
BY
ATTORNEY Patented Nov. 19, 1946

2,411,217

UNITED STATES PATENT OFFICE 2,411,217

PEANUT ROASTER

John Levine, Brooklyn, N. Y.

Application August 19, 1944, Serial No. 550,246

3 Claims. (Cl. 219—35)

This invention relates to new and useful improvements in a peanut roaster.

More particularly, the invention contemplates the construction of a peanut roaster which is characterized by a container having an open front and a plurality of shelves for holding bags of peanuts. It is proposed to provide a door for closing the open front of said container. It is contemplated that an electric heater be mounted within the container for supplying the necessary heat. This electric heater is arranged in an electric circuit controlled by a time switch so that the time of roasting or heating may be controlled.

Still further the invention proposes a novel construction of the container to insure against excessive heat radiation.

The invention also contemplates a simple arrangement by which the peanut bags may be easily removed from the container.

Another object of the invention is a construction of a peanut roaster which is simple and durable, which operates efficiently, and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a peanut roaster constructed in accordance with this invention.

Fig. 2 is a perspective view of the peanut roaster shown in Fig. 1 but viewed from the back.

Fig. 3 is a fragmentary enlarged detailed view of the top portion of Fig. 2.

Fig. 4 is a fragmentary plan view of Fig. 3.

Fig. 5 is a horizontal sectional view of the peanut roaster.

Fig. 6 is an enlarged vertical sectional view taken on the line 6—6 of Fig. 1 but illustrating certain of the parts in different positions.

Fig. 7 is a perspective view of the time switch used for controlling the peanut roaster.

Fig. 8 is a plan view of Fig. 7.

Fig. 9 is an illustration of a bag of peanuts of the type capable of being heated in accordance with this invention.

The peanut roaster includes a casing 10 having an open front 11 and having a plurality of shelves 12 for holding bags of peanuts, such as the bag 13 illustrated in Fig. 9. Preferably the container 10 is constructed so as to retain its heat.

For this purpose the walls of the container 10 are made from separate layers 14 spaced from each other to produce a space 15. This space is hermetically sealed and evacuated so as to produce a good degree of vacuum.

A door 16 is provided for closing the open front of the container 10. This door is supported along one vertical edge of the container 10 by a hinge 17. The door 16 is in the nature of a shell. It includes a front wall 18 continuing into side walls 19 which continue into inwardly directed flanges 20.

An electric heater 21 is mounted upon one of the shelves 12. This electric heater is connected in an electric circuit which includes a cable 22 provided with a plug 23 for being plugged into a conventional electric socket. The circuit also includes an electric time switch 24 which has the usual pointer 25 which may be set to various times so that the electric circuit of the heater is cut off after a predetermined time interval.

The door 16 is normally urged into a closed position by a spring construction. This spring construction includes a pair of leaf springs 26 mounted near the top and the bottom of the container 10. These leaf springs 26 are connected with brackets 27 which in turn are pivotally connected with the door 16 by the pintle hinge 28. Curl springs 29 are mounted upon the pintle hinge 28 and act between the brackets 27 and the door 16 for assisting said leaf springs 26 in resiliently urging the door 16 closed.

It is proposed that the bags of peanuts 13 be placed upon the shelves 12 so that the open ends of the bags project from the front edges of the shelves 12, schematically shown by the dot and dash lines 13' in Fig. 5. The projecting front ends of the bags of peanuts 13 will project into the space between the flanges 20 and the door 16.

A simple grip means is mounted within the hollow of the door 16 and is for the purpose of gripping the front projecting ends of the bags 13 when this is desired, particularly, when it is desired to remove all of the bags of peanuts from the shelves 12 simultaneously. More specifically, a pair of vertical bars 30 is located within the hollow of the door 16 and have their top and bottom ends slidably mounted in tracks 31 disposed upon the inner faces of the top and bottom walls 19 and said door 16. These bars 30 are normally urged together by springs 32 connected between top ends of the bars 30 and positioned behind the top flanges 20 of the door 16.

The bars 30 are capable of being held in separated positions by a cross rod 33. This cross rod 33 is mounted upon a stem 34 passing through the front wall 18 of the door 16. An external handle 35 is mounted upon the external end of the stem 34. The adjacent edges of the vertical bars 30 are formed with slight recesses 36 for accommodating the cross rod 33 with the latter as in a vertical position. The knob 35 may be turned to position the cross rod 33 transversely, as illustrated in Fig. 1, and then the cross bar 33 will hold the vertical bars 30 in separated positions. In this latter position, the front ends of the bags 13 extend inwards between the bars 30. When the handle 35 is turned to move the cross bar 33 to a vertical position, as illustrated in Fig. 6, the vertical bars 30 will move together, and grip and hold the front ends of the bags of peanuts 13. Now when the door 16 is opened, the bags of peanuts will be pulled from and thus be removed from the shelves 12.

The operation of the peanut roaster is as follows:

The bags of peanuts 13 are placed upon the shelf 12, the door 16 is released, and it will be closed by the springs 26 and 29. The timing switch 24 is then turned on and set for a predetermined time. The heater 21 will supply the necessary heat during this time interval. At the end of the time interval the switch 24 will cut off the electric current of the heater.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A peanut roaster, comprising a heat insulation container having an open front and a plurality of shelves for holding bags of peanuts, a shell-like door having a hollow inner face and adapted to close said open front, a heater for said container, and within said hollow of said shell-like door a pair of vertical bars slideably mounted in said door and providing a gripping means for said bag, means for urging said bars together, and means for holding said bars in separated positions.

2. A peanut roaster, comprising a heat insulation container having an open front and a plurality of shelves for holding bags of peanuts, a shell-like door having a hollow inner face and adapted to close said open front, a heater for said container, a pair of vertical bars providing a grip means for said bags of peanuts within said shell-like door spring, means for urging said bars together located behind the top flanges of said shell-like door, and means for holding said rods in separated positions, said vertical bars being guided at their ends on tracks mounted within said shell-like door.

3. A peanut roaster, comprising a heat insulation container having an open front and a plurality of shelves for holding bags of peanuts, a shell-like door having an open inner face and adapted to close said open front, a heater for said container, a pair of vertical bars within said shell-like door, means for urging said bars together, and means for holding said rods in separated positions, comprising a cross rod engageable with the edges of said vertical bars, a stem for turnably supporting said cross rod, and a knob for turning said stem.

JOHN LEVINE.